(12) United States Patent
Clapper

(10) Patent No.: US 6,501,516 B1
(45) Date of Patent: Dec. 31, 2002

(54) REMOTELY CONTROLLING VIDEO DISPLAY DEVICES

(75) Inventor: Edward O. Clapper, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 145 days.

(21) Appl. No.: 09/596,396

(22) Filed: Jun. 16, 2000

(51) Int. Cl.[7] .......................... H04N 11/00; H04N 5/45; H04N 5/445; H04N 5/44; G09G 5/00; G09G 5/08; G08C 19/00

(52) U.S. Cl. .................. 348/734; 348/563; 348/564; 348/565; 348/552; 345/169; 345/158; 340/825.69; 340/825.72

(58) Field of Search ............................... 348/734, 563, 348/564, 565, 552, 114; 340/825.69, 825.72, 825.24, 825.25, 825.31, 825.34; 345/169, 325, 352, 146, 158; 359/142; 341/176, 20

(56) References Cited

U.S. PATENT DOCUMENTS

| | | | | |
|---|---|---|---|---|
| 4,825,209 A | * | 4/1989 | Sasaki et al. | 340/825.72 |
| 5,598,523 A | * | 1/1997 | Fujita | 395/352 |
| 5,734,377 A | * | 3/1998 | Fukuzaki | 345/173 |
| 5,767,919 A | * | 6/1998 | Lee et al. | 348/569 |
| 5,936,611 A | * | 8/1999 | Yoshida | 345/158 |
| 6,137,534 A | * | 10/2000 | Anderson | 348/222 |
| 6,198,481 B1 | * | 3/2001 | Urano et al. | 345/348 |
| 6,215,417 B1 | * | 4/2001 | Krass et al. | 341/20 |

* cited by examiner

Primary Examiner—John Miller
Assistant Examiner—Paulos Natnael
(74) Attorney, Agent, or Firm—Trop, Pruner & Hu, P.C.

(57) ABSTRACT

A processor-based system may be controlled by a remote control unit. An image of the remote control unit may be displayed on a display associated with the processor-based system. When a particular button on the remote control unit is depressed, a corresponding indication may be provided on the image of the remote control unit.

27 Claims, 8 Drawing Sheets

REMOTELY CONTROLLING VIDEO DISPLAY DEVICES

BACKGROUND

This invention relates generally to remotely controlling appliances or computer systems, including television receivers.

Remote control units may be utilized to control television receivers and other devices including computer systems and appliances without the necessity to walk over to the device to alter its settings. For example, infrared-based remote controls are commonly used with television receivers. Similarly, infrared remote controls are used with entertainment systems.

In a variety of circumstances, the remote control may be utilized in a room that is relatively dark. Even in the case where the user is watching television, there may be insufficient light to be able to view the various buttons on the remote control unit.

In devices called set-top boxes, the user may use a remote control unit to enter text displayed on a television receiver. That is, computer functions may be actually implemented using a set-top box controlled by the remote control unit and associated with the television receiver. Thus, the user may input relatively complex textual input commands to the set-top box through the remote control unit. These commands may appear on the television display. However, in many cases, it is awkward for the user to look downwardly at the remote control unit at the same time the user should be looking upwardly at the display to see the entries as they are displayed. For example, if the user is entering text through the remote control unit, it may work better to watch the display rather than to watch the information being typed into the remote control unit in accordance with touch-typing principles associated with conventional keyboards.

Thus, there is a need for a better way to provide input commands using remote control units that facilitates data entry in a low light environment and that further facilitates the entry of more complex text input commands.

DETAILED DESCRIPTION

Figure 1:
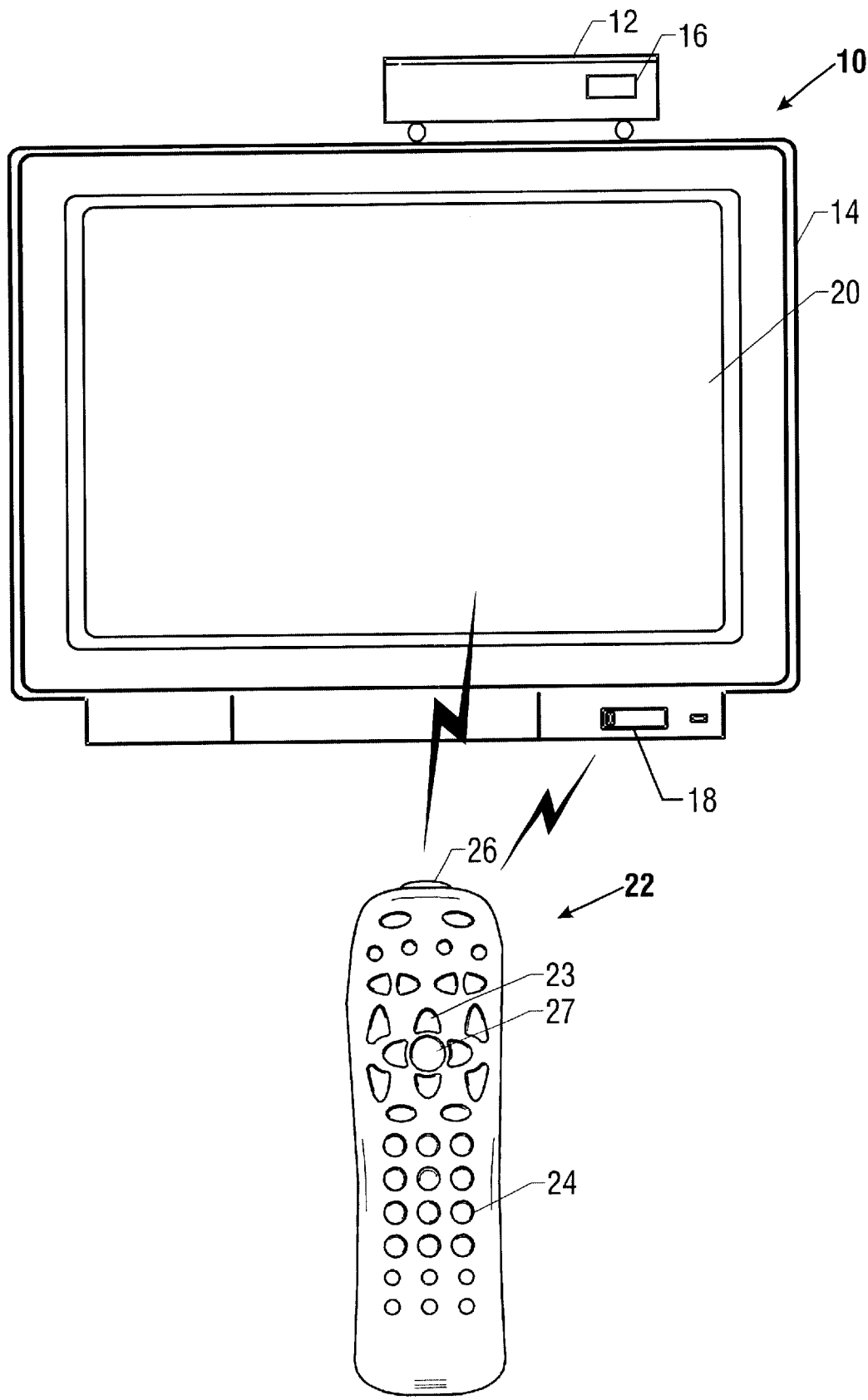
FIG. 1 is a front elevational view of a processor-based system, in accordance with one embodiment of the present invention.

A processor-based system 10, shown in FIG. 1, may be implemented as a set-top box, in accordance with one embodiment of the present invention. However, other processor-based systems including desktop computer systems, laptop computer systems, and appliances including processor-based systems such as television receivers may implement the present invention.

In FIG. 1, a set-top box 12 sits atop a television receiver 14. Both the set-top box 12 and television receiver 14 are controlled by a remote control unit 22. In accordance with one embodiment of the present invention and infrared interface may be implemented between a transceiver 26 on the remote control unit 22 and transceivers 18 and 16 associated with the television receiver 14 and set-top box 12 respectively. However, other wireless protocols may be utilized including radio frequency protocols and a Bluetooth protocol.

As used herein, a remote control unit may be any wireless peripheral that operates a processor-based system including the type of remote control unit commonly associated with television receivers. A wireless keyboard, wireless mouse, and wireless tablet are additional examples of remote control units.

The remote control unit 22 may include a variety of buttons indicated at 23, 24 and 27 for generating wireless signals from the transceiver 26. These signals are received by the transceivers 16 and 18 to control the operation of the set-top box 12 or the television receiver 14 respectively. The resulting control signals produced by the transceiver 26 may be simple television control signals, such as "adjust volume", "change channel", or "turn the television receiver 14 on" or "off". In addition, the commands may be complex textual inputs to control the set-top box 12 to implement conventional computer systems including navigating the Internet, initiating a purchase transaction, or providing information to a variety of forms, as a few examples.

Figure 2:
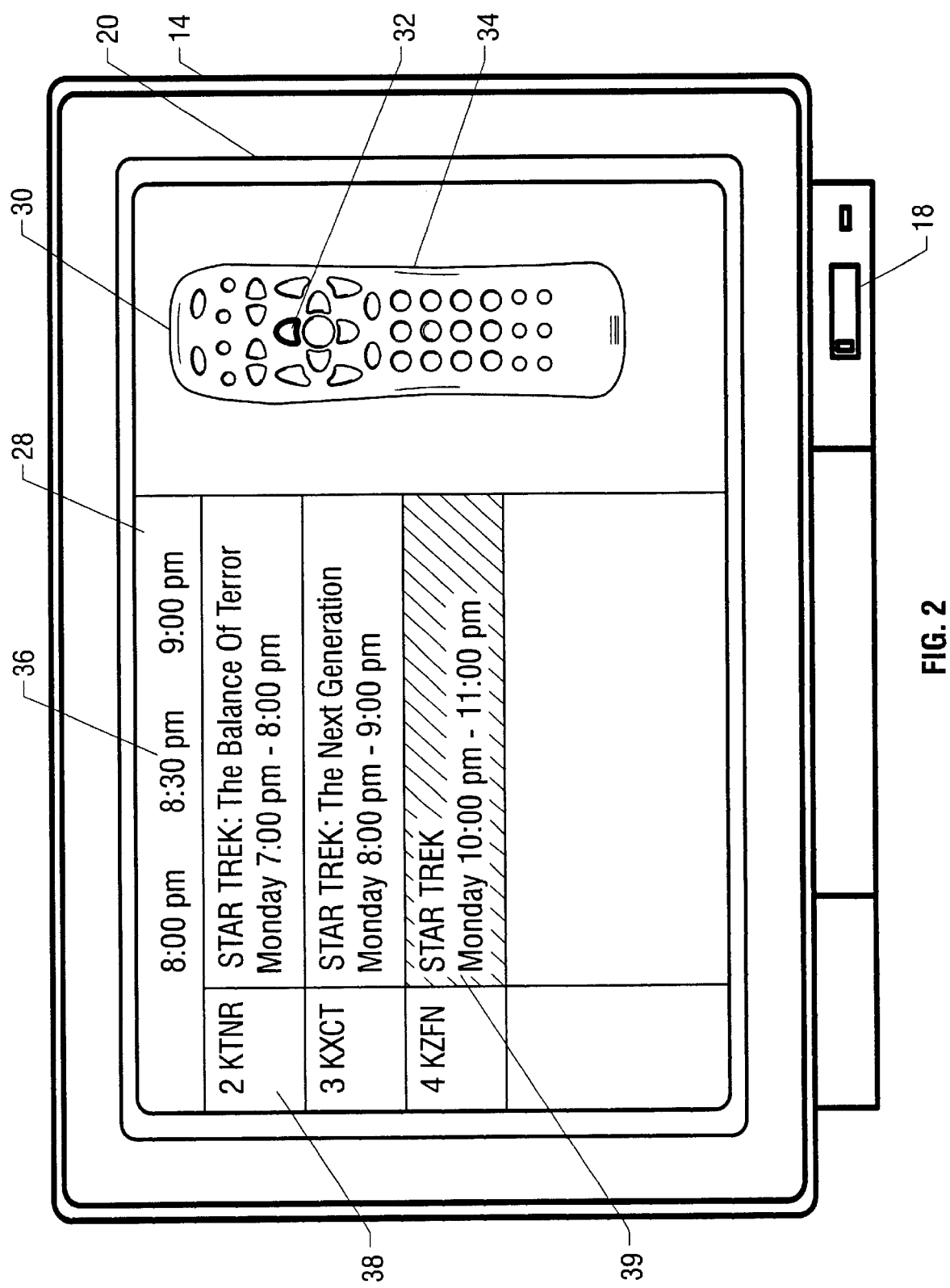
FIG. 2 is a front elevational view of the television receiver shown in FIG. 1 in operation, in accordance with one embodiment of the present invention.

Referring next to FIG. 2, a graphical user interface 28 may be displayed on the television screen 20 of the television receiver 14, in accordance with one embodiment of the present invention. In this case, an electronic programming guide software application may be implemented in which a variety of television channel indicators 38 and associated program information 36 may be displayed in a grid display on the television receiver 14. In a conventional electronic programming guide, a plurality of television programs (such as the Star Trek programs indicated) are associated with channel indications 38 and time indications 36. By mouse clicking on one of the program entries, the user may select a program for automatic television tuning. Conventionally, the input commands to select a particular program may be provided from the remote control unit 22, shown in FIG. 1, using the navigation keys 23. By pressing on the navigator button 23, the position-of the highlighting may be moved, and by pressing the select button 27, a particular highlighted entry may be selected.

An image 34 of the remote control unit 22 may be displayed in association with the graphical user interface 28. The image 34 may reflect the button arrangement of the actual remote control unit 22. When the user selects a button on the real remote control unit 22, such as the button 23, the corresponding button image 32 is highlighted as indicated in FIG. 2.

In fact, before actually selecting a particular button on the remote control unit 22, the user may lightly depress a particular button such as the button 23 causing the associated button image 32 on the remote image 34 to be highlighted. This facilitates selecting the correct button on the remote control unit 22 by allowing the user to view the intended selection on the image 34 before it is finally entered. In the example shown in FIG. 2, the user selects the UP button 23 causing the button image 32 to be highlighted. Thus, the cursor selection may be moved from the highlighted Star Trek listing 39 on channel 4 upwardly to the Star Trek program on channel 3.

Figure 3:
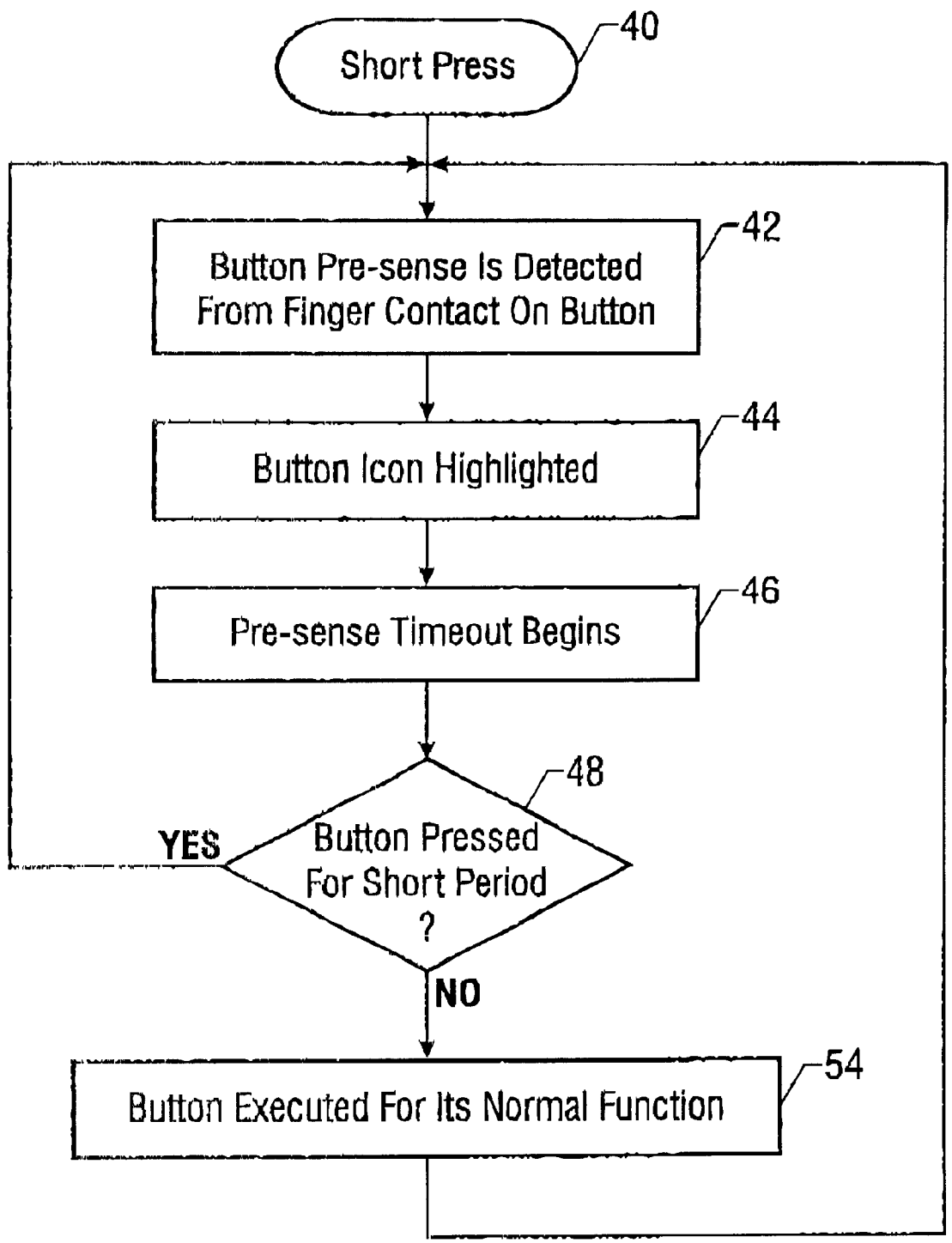
FIG. 3 is a flow chart for software resident on the set-top box shown in FIG. 1, in accordance with one embodiment of the present invention.

Referring to FIG. 3, the software 40, in accordance with one embodiment of the present invention, for implementing the heads-up display using the remote control unit image 34 begins by pre-sensing a button press on the remote control unit 22 as indicated in block 42. A wide variety of sensors may be provided to select a partial depression of a button, such as the button 23. In response to a depression of the button 23 for a short time, the user sees the button image 32, highlighted as indicated in block 44. In contrast, in response to a longer depression of a particular button, such as the button 23, the entry may be immediately implemented. However, the corresponding button image, such as the image 32, may be also highlighted at the same time, in some cases.

The short depression of a button, such as the button 23, begins a pre-sense time out, as indicated in block 46. If the button remains depressed for a sufficient time as determined in diamond 48, the button is operated for its normal function as indicated in block 54. If the button has been depressed for only a short time period as determined in diamond 48, the button function is not executed in one embodiment and only the button image is highlighted.

Figure 3A:
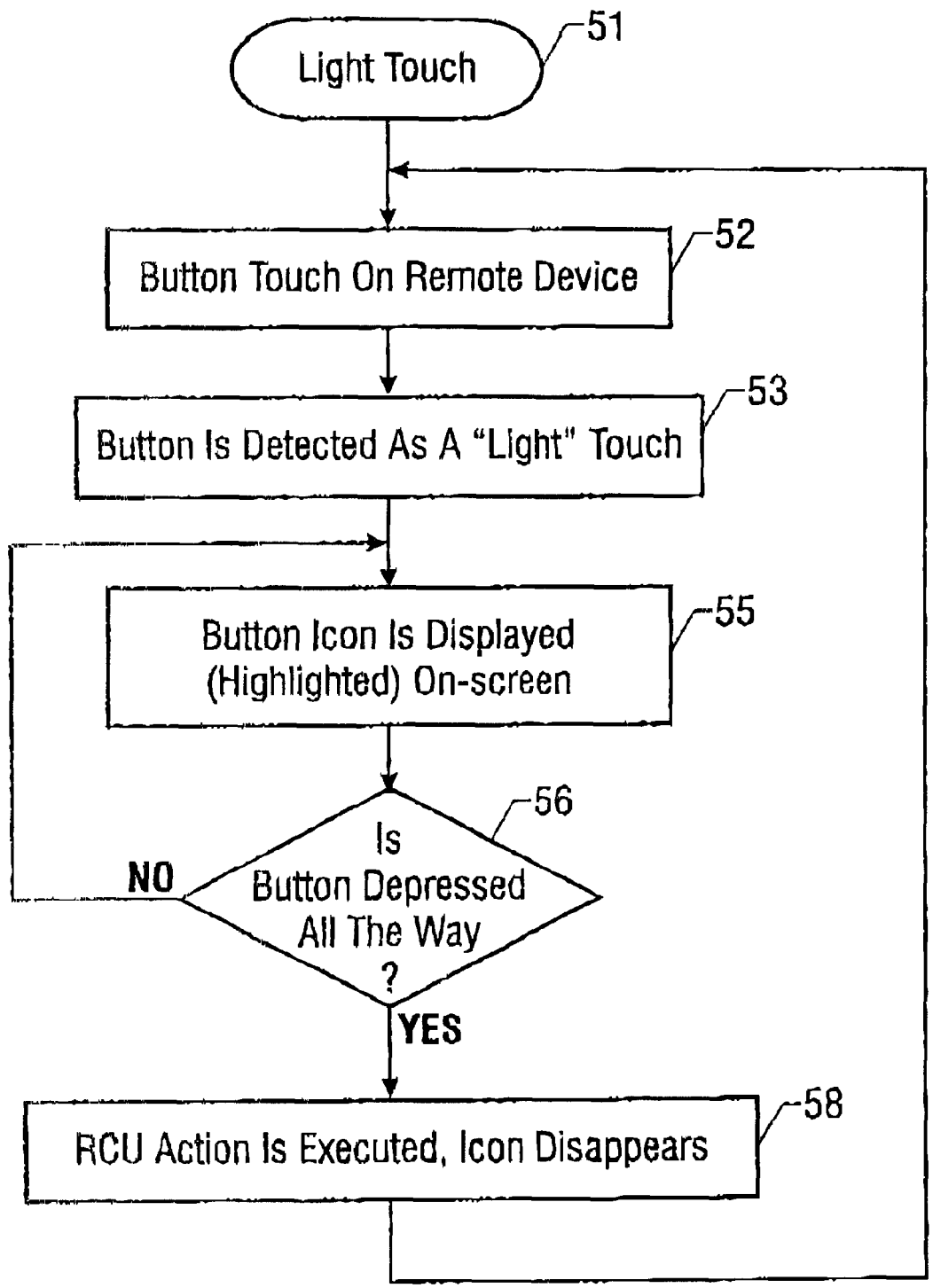
FIG. 3A is a flow chart for software resident on the set-top box shown in FIG. 1, in accordance with another embodiment of the present invention.

Referring to FIG. 3A, in accordance with another embodiment of the present invention, in response to a light touch of a button such as the button 23, the button image may be highlighted on the display and in response to a more forceful depression, the button function may be actually implemented. As indicated in block 52, if the button on a remote control unit is merely touched lightly, the button may be detected as a light touch as indicated in block 53. In such case, the button image may be highlighted on the display screen as indicated in block 55.

A check at diamond 56 determines whether the button has actually been depressed fully. If so, the remote control unit action associated with the button is executed and the icon disappears as indicated in block 58. Otherwise, the image is highlighted on screen as indicated in block 55 but no other action may be implemented in one embodiment of the present invention.

Thus, the indication of which button has been pressed may be determined in a number of different ways. In one embodiment, a light touch may actuate the button image without operating the function and in another embodiment, a short touch may implement the highlighting without executing the function. This allows the user to determine which button to press before actually implementing an operation.

In addition to highlighting the selected image on the remote control unit image 34, a sound may be made to indicated a light touch. A different sound may be made to indicate a full depression of a button, such as button 23, in some embodiments of the present invention.

Figure 4:
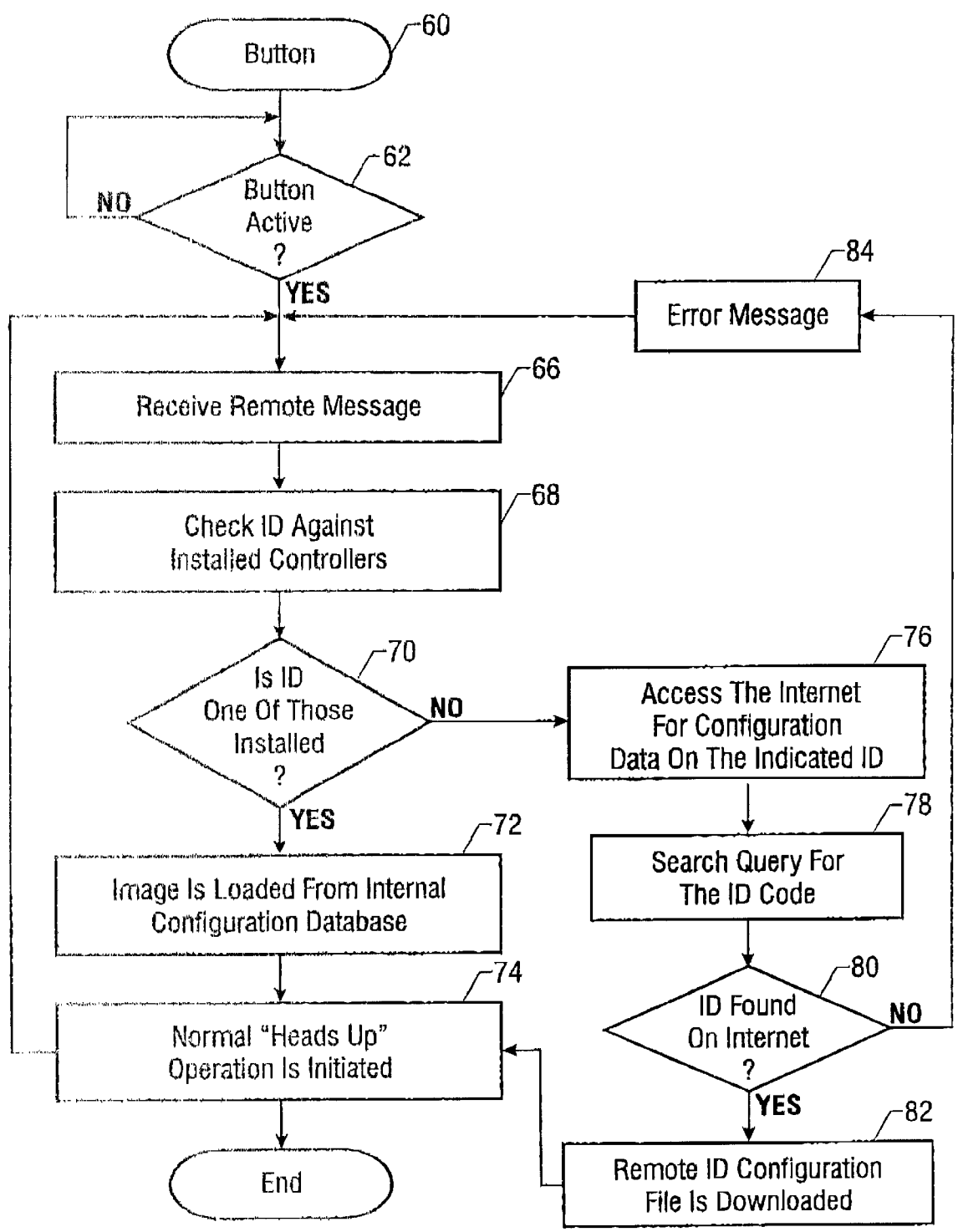
FIG. 4 is a flow chart for software resident on the set-top box, in accordance with one embodiment of the present invention.

The initial registration of a particular remote control unit 22 with a particular processor-based system 10 may be implemented using software 60, illustrated in FIG. 4, in accordance with one embodiment of the present invention. It is not necessary that a particular remote control unit 22 be pre-assigned to a particular processor-based system 10 in order to accurately display an image of the remote control unit 22. Instead, a database may be utilized on the processor-based system 10 to recognize a particular remote control unit 22 and to display its appropriate image from a database of remote control unit identifiers and corresponding images.

Initially, a check at diamond 62 determines whether any button on the remote control unit 22 has been activated. If so, the processor-based system 10 receives a remote message including a remote control unit identifier as indicated in block 66. The processor-based system 10 checks the identifier of the remote control unit 22 against a database of remote control units (block 68). An identifier of the remote control unit 22 may be automatically transmitted from the remote control unit 22 with every depression of a button on the remote control unit 22, in one embodiment of the present invention. Alternatively, the identifier may only be transmitted one time after power up.

A check at diamond 70 determines whether the received identifier is one of the known remote control units 22 that may be accounted for in a database on the processor-based system 10. If not, the processor-based system 10 may access the Internet for configuration data for the indicated identifier as indicated in block 76. A search may be implemented through known websites to identify the identifier of the remote control unit 22 as indicated in block 78. Alternatively, a single web site may be accessed that has information for a variety of remote control units. If the identifier is found over the Internet, as determined in diamond 80, the remote identifier configuration file is downloaded as indicated in block 82. Otherwise, an error message may be generated as indicated in block 84.

If the identifier is one that is already in the existing database associated with the processor-based system 10 as determined in diamond 70, the information may be loaded from the internal configuration database as indicated in block 72. Once an image 34 has been displayed for the appropriate remote control unit 22, normal operation may be implemented as indicated in block 74.

Figure 5:
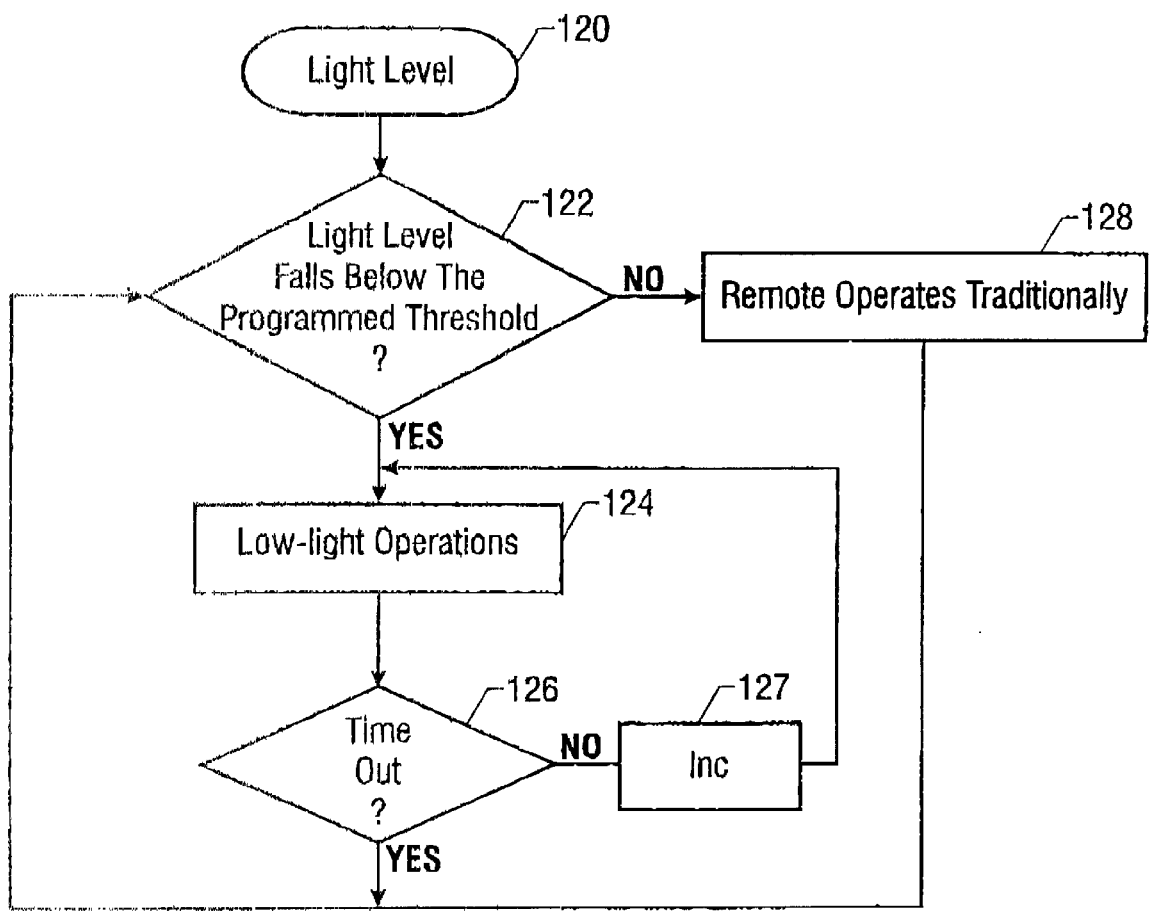
FIG. 5 is flow chart for software also resident on the set-top box, in accordance with one embodiment of the present invention.

Referring next to FIG. 5, in accordance with one embodiment of the present invention, the generation of the image 34 may be selectively implemented based on the ambient light conditions. The light level software 120 begins by determining whether the light level has fallen below a programmed threshold, as indicated in diamond 122. This determination may be made by a light level indicator associated with the processor-based system 10. If the light level is above the programmed threshold, the operation proceeds as is traditionally associated with remote control unit 22 without the use of the image 34, as shown in block 128.

If the light level is low, the low light level operations are implemented using the image 34 as indicated in block 124 and as described previously herein. A time check at diamond 126 determines whether a predetermined time period has passed. If so, the system 10 rechecks to determine what is the current light level, at diamond 122. Otherwise, a timer may be incremented at block 127 and the flow iterates.

Figure 6:
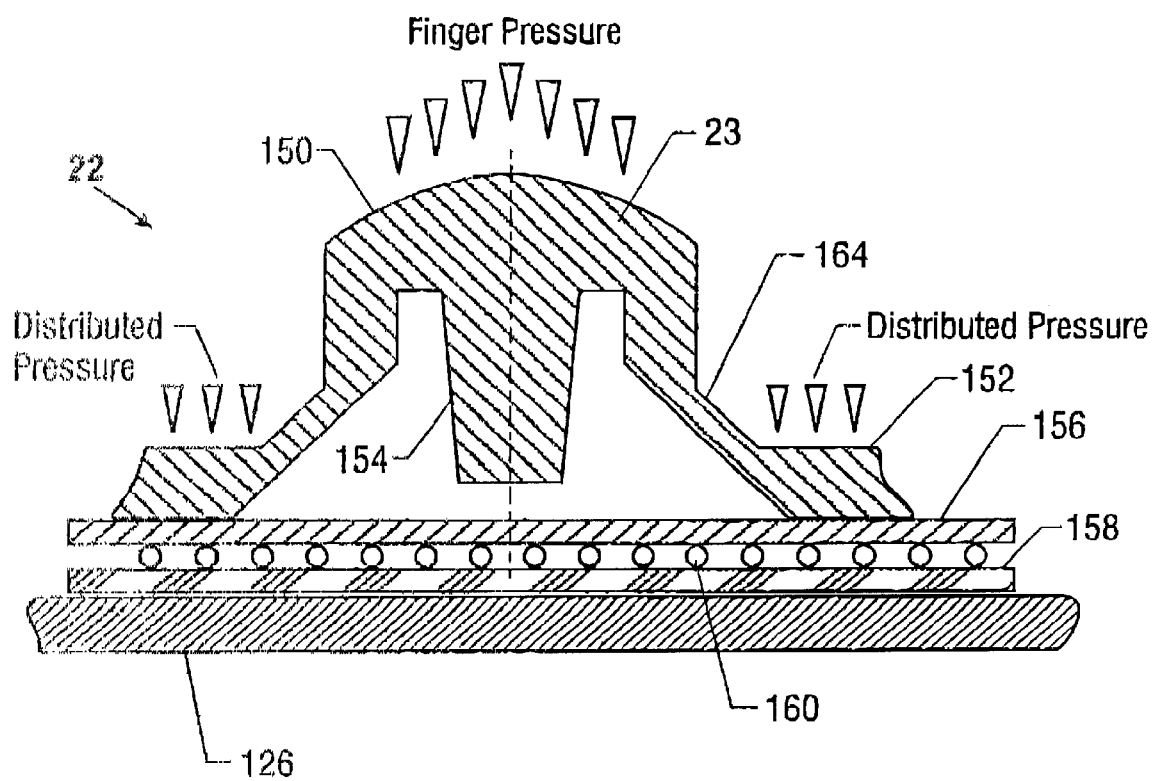
FIG. 6 is a partial, greatly enlarged cross-sectional view of one of the buttons on the remote control unit shown in FIG. 1, in accordance with one embodiment of the present invention.
Figure 7:
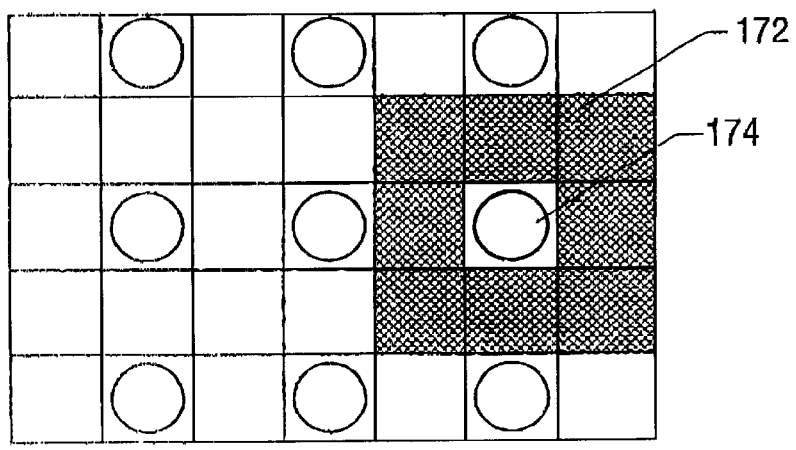
FIG. 7 is a partial, top plan view of a portion of the contact pad under the button shown in FIG. 6, in accordance with one embodiment of the present invention.

Referring to FIG. 6, each button, such as the button 23, of the remote control unit 22 may be a two-way acting button. When the user presses on a dome 150, with a light pressure, the resulting distributed force is applied to a portion 152 around the periphery of the dome 150 via a connecting section 164. Thus, a peripheral area of a conductive layer 156 is pressed, compressing flexible separators 160 over a resistive layer 158. As a result, the peripheral areas, indicated at 172 in FIG. 7, around a central area 174 are exposed to a light pressure, changing the distance between layers and thereby causing a detectable characteristic change, such as a resistance change. This activation of the areas 172 may be recognized as a partial button depression for use in connection with the software 40 shown in FIG. 3.

The natural resiliency of the section 164 operates as an effective absorbing spring that prevents the actuation of the central pin 154 in response to light finger pressure. Thus, the spring action of the section 164 is sufficient to prevent the pin 154 from contacting the conductive layer 156 until the finger pressure exceeds a predetermined threshold.

If the pin 154 contacts the conductive layer 156, then the region 174 may be activated as well as the region 172. This in turn may be recognized as a full button depression by the software 40 illustrated for example in FIG. 3.

Figure 8:
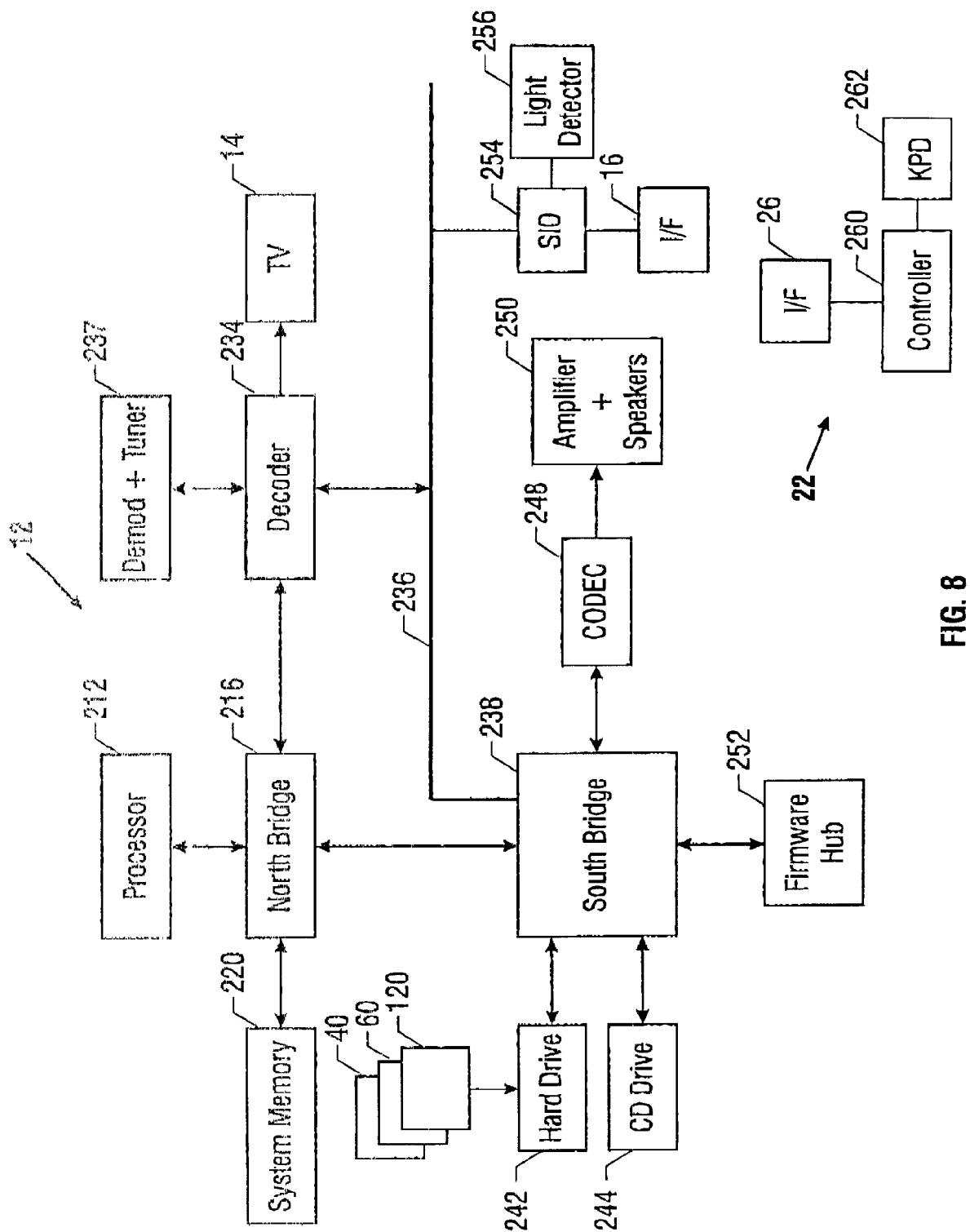
FIG. 8 is a block diagram of the system shown in FIG. 1, in accordance with one embodiment of the present invention.

Turning next to FIG. 8, the processor-based system 10, in an embodiment in which the system 10 is a set-top box 12, may include a processor 212 coupled to a north bridge 216 in one embodiment. The north bridge 216 may couple a system memory 220 and a decoder 234. The decoder 234 may receive demodulated, tuned signals from a demodulator and tuner 237. The tuner 237 for example, may be coupled to a source of television signals such as a cable connection, a satellite connection or the Internet. The decoder 234, in accordance with one embodiment of the present invention, may be a Motion Picture Experts Group (MPEG) compliant decoder. The decoder 234 may provide decoded television signals directly to the television receiver 14. It may also provide video signals and decoded audio signals to a bus 236.

The bridge 216 may couple a south bridge 238. The south bridge may be coupled to a hard disk drive 242 and a compact disk drive 244. The software 40, 60 and 120 may be conventionally stored on the hard drive 242 for execution from the system memory 220.

The south bridge 238 may couple audio signals to a coder-decoder (codec) 248 that drives amplifiers and speakers 250. The speakers 250 may be associated in some embodiments with the television receiver 14.

A serial input/output (SIO) device 254 may also be coupled to the bus 236. It may in turn be coupled to a light level detector 256 and the wireless transceiver 16. The wireless transceiver 16 enables communications with the remote control unit 22. The remote control unit 22 may include the interface 26, a controller 260, and the keypad 262 that includes the buttons 23, 24 and 27.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining the ambient light conditions of the room;
   selectively displaying an image of a remote control unit on a tv screen depending on said light conditions;
   receiving a control signal from a remote control unit; and
   altering the image of said remote control unit in response to said control signal.

2. The method of claim 1 wherein receiving the control signal includes receiving a wireless control signal.

3. The method of claim 1 further including identifying a particular control unit, checking a database of control units and displaying an image of the identified control unit.

4. The method of claim 1 wherein said remote control unit includes a plurality of operable buttons, said method further including recognizing a particular button operation on said remote control unit, and altering the image of said remote control unit in response to operation of said button.

5. The method of claim 3 wherein altering the image includes highlighting the image of a selected button on the image of said remote control unit.

6. The method of claim 1 wherein said remote control unit includes a plurality of buttons, said method further including determining the nature of the operation of one of said buttons.

7. The method of claim 6 including determining whether said button was lightly depressed or fully depressed.

8. The method of claim 7 including altering the image of said remote control unit in response to a light depression of said button without executing the function associated with said button.

9. The method of claim 1 including identifying a remote control unit by an identifier provided from said remote control unit and determining whether said identifier exists in a database.

10. The method of claim 9 wherein if said identifier does not exist in a database, accessing a remote network to obtain information about said identifier, upon obtaining said identifier, obtaining information about the configuration of said remote control unit, and displaying an image of said remote control unit.

11. An article comprising a medium storing instructions that enable a processor-based system to:
    determine the ambient light conditions of the room;
    selectively display an image of a remote control unit on a tv screen depending on the light conditions;
    receive a control signal from a remote control unit; and
    alter the image of said remote control unit in response to said control signal.

12. The article of claim 11 further storing instructions that enable the processor-based system to receive a wireless control signal.

13. The article of claim 11 further storing instructions that enable the processor-based system to identify a particular control unit, check a database of control units, and display an image of the identified control unit.

14. The article of claim 11 further storing instructions that enable the processor-based system to recognize a particular button operation on said remote control unit and alter the image of said remote control unit in response to operation of said button.

15. The article of claim 14 further storing instructions that enable the processor-based system to highlight the image of the selected button on the image of said control unit.

16. The article of claim 14 further storing instructions that enable the processor-based system to determine the nature of the operation of a remote control unit button.

17. The article of claim 16 further storing instructions that enable the processor-based system to determine whether said button was lightly depressed or fully depressed.

18. The article of claim 17 further storing instructions that enable the processor-based system to alter the image of said remote control unit in response to a light depression of said button without executing the function associated with said button.

19. The article of claim 11 further storing instructions that enable the processor-based system to identify a remote control unit by an identifier provided from said remote control unit and determine whether said identifier exists in a database.

20. The article of claim 19 further storing instructions that enable the processor-based system to access a remote network to obtain information about said identifier, and upon obtaining said identifier, obtain information about the configuration of said remote control unit and display an image of said remote control unit.

21. A system comprising:

a processor;

a light detector coupled to said processor;

an interface to receive signals from a remote control unit, said interface coupled to said processor, and a storage coupled to said processor, said storage storing instructions that enable said processor to display an image of a remote control unit on a tv screen, receive a control signal from the remote control unit, alter the image of the remote control unit in response to said control signal and enable the processor to selectively display that image depending on said light conditions of the room.

22. The system of claim 21 wherein said interface is a wireless interface.

23. The system of claim 21 wherein said system is a set-top box.

24. The system of claim 21 wherein said storage further stores instructions that enable the processor to identify a particular remote control unit, check a database of remote control units, and display an image of the identified remote control unit.

25. The system of claim 21 wherein said storage stores instructions that enable said system to determine the nature of an input from said remote control unit.

26. The system of claim 25 including a remote control having a sensor and a button, said sensor determining whether the button was pressed in one of two ways.

27. The system of claim 26 wherein if said button is pressed in a first way, the image of the corresponding button on said image of said remote control unit is altered but the function normally activated by operation of said button is not activated.

* * * * *